United States Patent
McKinley

(10) Patent No.: US 9,458,949 B2
(45) Date of Patent: Oct. 4, 2016

(54) LOADING DEVICES AND METHODS OF LOADING PIPE FUSION MACHINES

(76) Inventor: Richard S. McKinley, Palisade, CO (US)

(*) Notice: Subject to any disclaimer, the term of this patent is extended or adjusted under 35 U.S.C. 154(b) by 966 days.

(21) Appl. No.: 13/212,251

(22) Filed: Aug. 18, 2011

(65) Prior Publication Data

US 2013/0045074 A1  Feb. 21, 2013

(51) Int. Cl.
*F16L 1/09* (2006.01)
*F16L 1/06* (2006.01)

(52) U.S. Cl.
CPC ... *F16L 1/09* (2013.01); *F16L 1/06* (2013.01)

(58) Field of Classification Search
CPC ............ F16L 1/09; F16L 1/12; F16L 1/036; F16L 1/06; B29C 65/18; B29C 65/20; B29C 65/7802; B29C 65/2084; B63C 3/00; B63C 3/02
USPC . 254/89 R, 104, 2 B, 10 R, 8 B, 89 H, 93 R, 254/93 H, 120, 134; 414/800
See application file for complete search history.

(56) References Cited

U.S. PATENT DOCUMENTS

| | | | |
|---|---|---|---|
| 1,877,974 A * | 9/1932 | Robb | 414/745.6 |
| 2,378,570 A * | 6/1945 | Mitchell | 294/110.1 |
| 2,737,140 A | 3/1956 | Totten | |
| 3,077,277 A * | 2/1963 | Holzman | B60P 3/1066 414/534 |
| 3,561,615 A | 2/1971 | Forsberg et al. | |
| 4,176,269 A | 11/1979 | Merrick et al. | |
| 4,209,279 A * | 6/1980 | Aasen | B60P 3/1075 280/414.1 |
| 4,990,209 A | 2/1991 | Rakes | |
| 5,843,271 A * | 12/1998 | Andrew et al. | 156/499 |
| 6,012,752 A | 1/2000 | Douglas | |
| 7,076,852 B2 * | 7/2006 | Penman | B23P 19/061 285/38 |
| 7,357,163 B2 * | 4/2008 | Wager | 144/4.1 |
| 7,878,732 B2 * | 2/2011 | Sandoval | B63B 21/00 405/1 |
| 7,926,534 B2 | 4/2011 | Temple | |
| 2005/0117973 A1 | 6/2005 | Nelson | |
| 2009/0194014 A1* | 8/2009 | Kloster et al. | 114/263 |
| 2010/0192346 A1* | 8/2010 | Simmons | 29/281.1 |

OTHER PUBLICATIONS

European Patent Office Communication pursuant to Rules 161(1) and 162 EPC, dated Mar. 25, 2014, pertaining to European patent application No. 11767853.2.
International Preliminary Report on Patentability dated Feb. 27, 2014, pertaining to International patent application No. PCT/2011/052444.

(Continued)

*Primary Examiner* — Monica Carter
*Assistant Examiner* — Seahee Yoon
(74) *Attorney, Agent, or Firm* — Dinsmore & Shohl LLP; Monika L. Jaensson, Esq.

(57) ABSTRACT

A loading device for lifting an elongated object having an elongate axis includes a frame having a first fulcrum surface and a second fulcrum surface, a first effector arm that pivots about the first fulcrum surface, a second effector arm that pivots about the second fulcrum surface, and an actuator moving the first effector arm and the second effector arm between a retracted position and a deployed position.

14 Claims, 6 Drawing Sheets

(56) References Cited

OTHER PUBLICATIONS

International Search Report and the Written Opinion of the International Searching Authority. Jun. 29, 2011. PCT/US2011/052444. (related case).

Office Action dated Oct. 23, 2015 pertaining to Eurasian Patent Application No. 201490476.

Extended European search report dated dated Jun. 3, 2016 pertaining to European Patent Application No. 15195935.0.

* cited by examiner

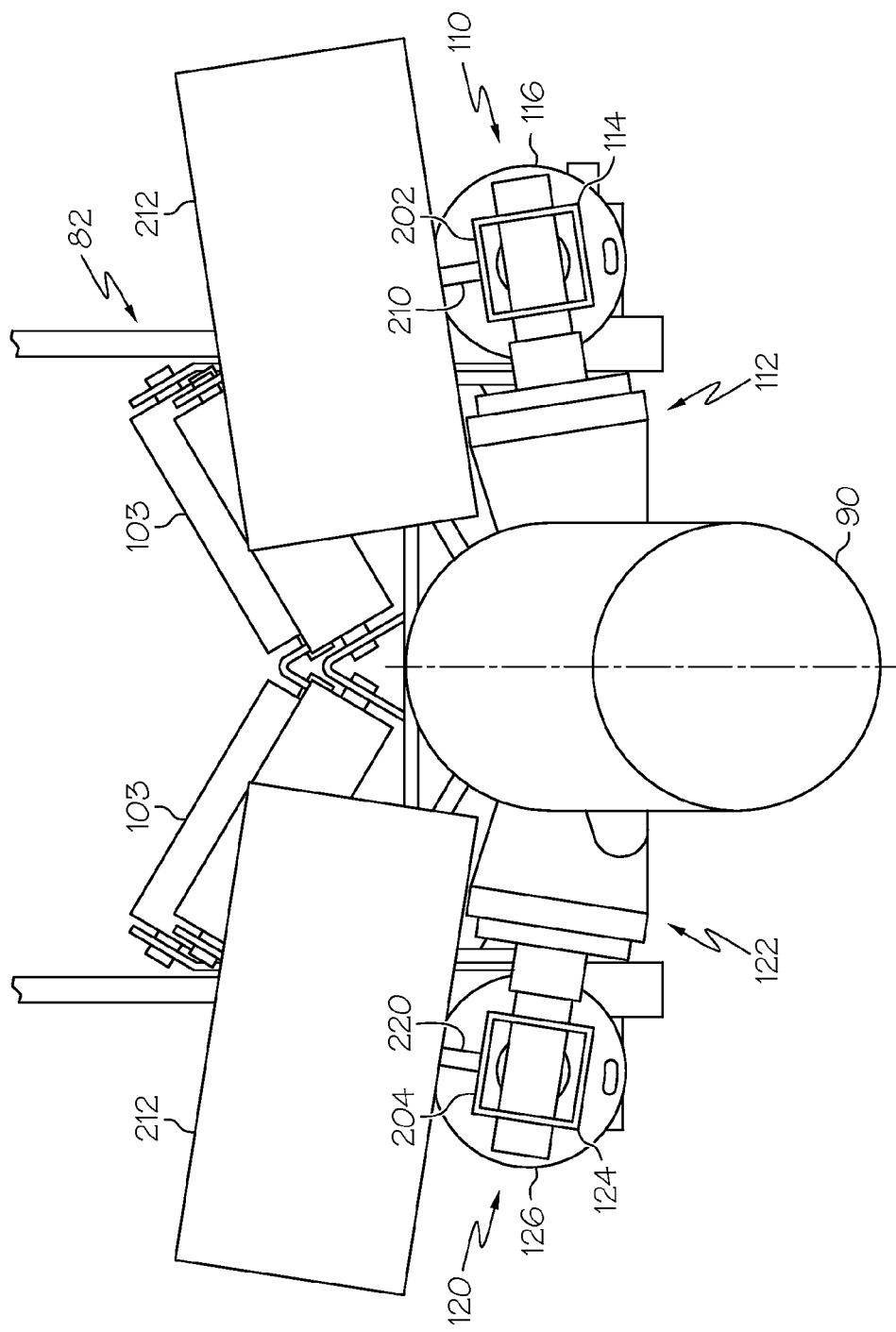

US 9,458,949 B2

LOADING DEVICES AND METHODS OF LOADING PIPE FUSION MACHINES

TECHNICAL FIELD

The present disclosure is generally directed to loading devices for pipe fusion machines.

BACKGROUND

Polyethylene pipe is used commercially for the construction of pipelines for various applications such as natural gas, water, sewer, and other materials. In addition, polyethylene pipe may be used as conduit to protect transmission cables such as high voltage electricity, fiber optic telecommunication, telephone, cable television, and other signal cables.

Polyethylene pipe is typically joined through a process called fusion welding, the most common joint being a butt joint. A butt joint is formed by holding the two sections of pipe rigidly, performing a facing operation to square the ends of the pipes and prepare the pipes for welding, then heating the prepared faces of the pipes on a hot plate to the melting point, removing the heating element, and forcing the two melted faces together. The resulting joint may be cooled before being subjected to any handling forces. The result is a fused joint that is as strong or stronger than the parent material and is very reliable.

U.S. Pat. No. 4,990,209 issued to George Rakes entitled "Self Propelled Fusion Machine" (Rakes) is a machine adapted to perform a fusion welding process on polyethylene pipe as described above. Rakes is incorporated herein by reference for all that it discloses and teaches. The Rakes machine performs a sequence of operations to fusion weld polyethylene pipe in a semi automated fashion, with provisions for easily loading and unloading the pipe as it is welded. Additionally, the Rakes device performs the fusion welding process in an enclosed environment, adding to the consistency and speed to a pipeline construction.

U.S. Pat. No. 7,926,534 issued to William Temple entitled "Pipe Welder for Simultaneously Fusing a Plurality of Polyethylene Pipes" (Temple) is a machine adapted to perform a fusion welding process on adjacent pipes, for example, pipes that run parallel to one another along a ditch. Temple is incorporated herein by reference for all that it discloses and teaches.

Both Rakes and Temple describe machines that travel along the direction of the pipe to perform the fusion welding operation to joint sequential pipes. In order to introduce the pipe to the machines of Rakes and Temple, a user must lift and position the pipe manually or using an additional machine such that the pipe fusion machine may prepare the pipes for the fusion welding operation.

Accordingly, a loading device that lifts and positions the pipe for a fusion welding operation is required.

SUMMARY

In one embodiment, a loading device for lifting an elongated object having an elongate axis includes a frame having a first fulcrum surface and a second fulcrum surface, a first effector arm that pivots about the first fulcrum surface, a second effector arm that pivots about the second fulcrum surface, and an actuator moving the first effector arm and the second effector arm between a retracted position and a deployed position.

In another embodiment, a loading device includes a frame having a first fulcrum surface and a second fulcrum surface, a first effector arm that pivots about the first fulcrum surface, where the first effector arm having a first end effector, and a second effector arm that pivots about the second fulcrum surface, where the second effector arm having a second end effector. The loading device also includes an actuator that moves the first effector arm and the second effector arm between a retracted position and a deployed position, where the first end effector and the second end effector each include a lifting surface inclined to a ground surface.

In yet another embodiment, a method of loading an elongated object having an elongate axis into a pipe fusion machine includes positioning a loading device coupled to the pipe fusion machine proximate to the elongated object, where the loading device includes a first effector arm and a second effector arm. The method of loading further includes positioning a first end effector coupled to the first effector arm and a second end effector coupled to the second effector arm along opposites sides of the elongated object, pivoting a first effector arm about a first fulcrum surface of the loading device towards the elongated object and the second effector arm about a second fulcrum surface of the loading device towards the elongated object, and contacting the elongated object with the first end effector and the second end effector to apply a lifting force to the elongated object at a location below the elongate axis.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 depicts a front view of a loading device according to one or more embodiments shown and described herein.

DETAILED DESCRIPTION

Figure 1:
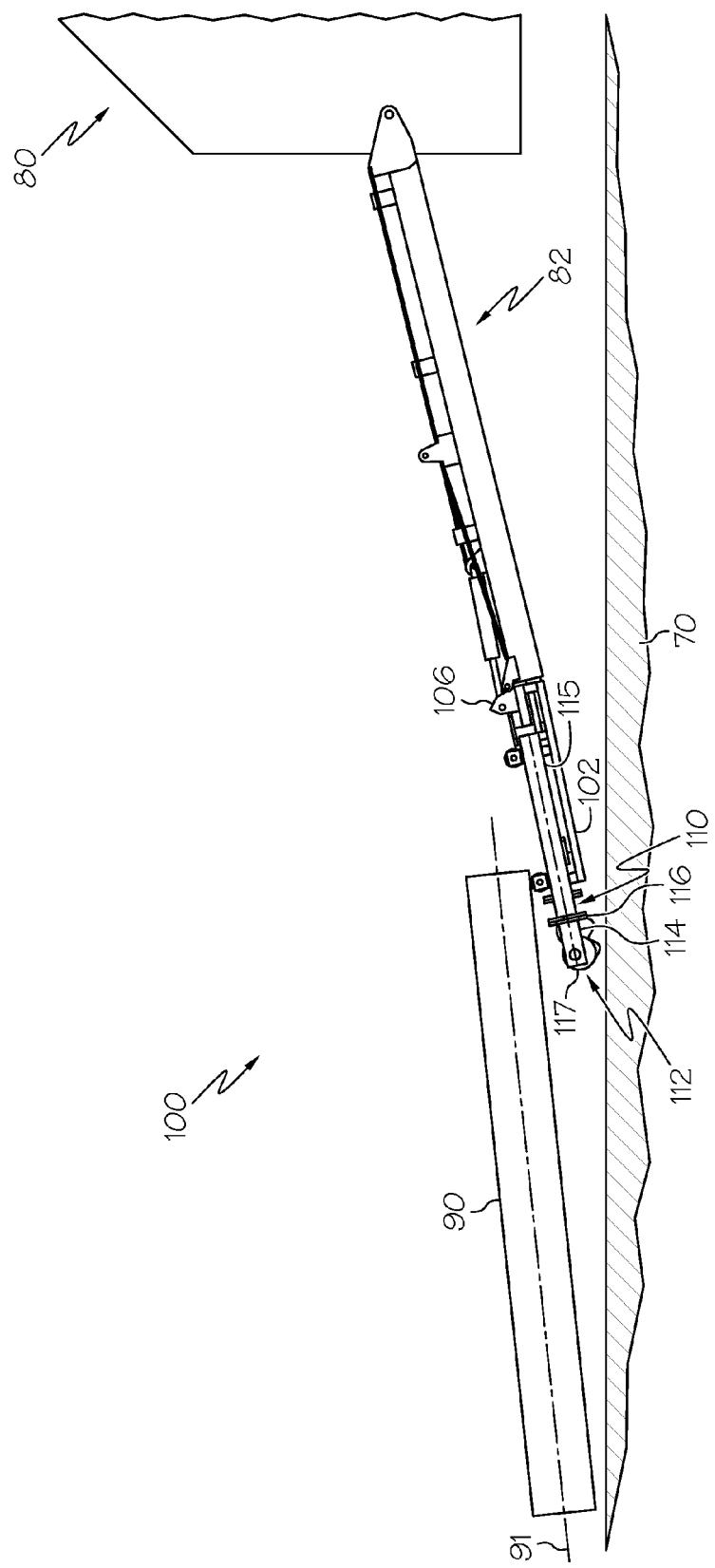
FIG. 1 depicts a side view of a loading device coupled to a pipe welding machine according to one or more embodiments shown and described herein.

Embodiments described herein relate to loading devices that lift elongated objects from a ground surface. The loading devices may be use in a variety of applications including, for example, lifting pipe to introduce the pipe to a pipe fusion machine. Referring to FIG. 1, one embodiment of a loading device for lifting an elongated object for introduction to a pipe fusion machine is depicted. The loading device contacts the elongated object, for example a polyethylene pipe, positioned on a ground surface and applies a lifting force that lifts the elongated object at least partially off the ground surface. With the elongated object appropriately positioned and lifted off of the ground surface, the pipe fusion machine may translate towards the elongated object, positioning the elongated object for a fusion welding operation.

Figure 2:
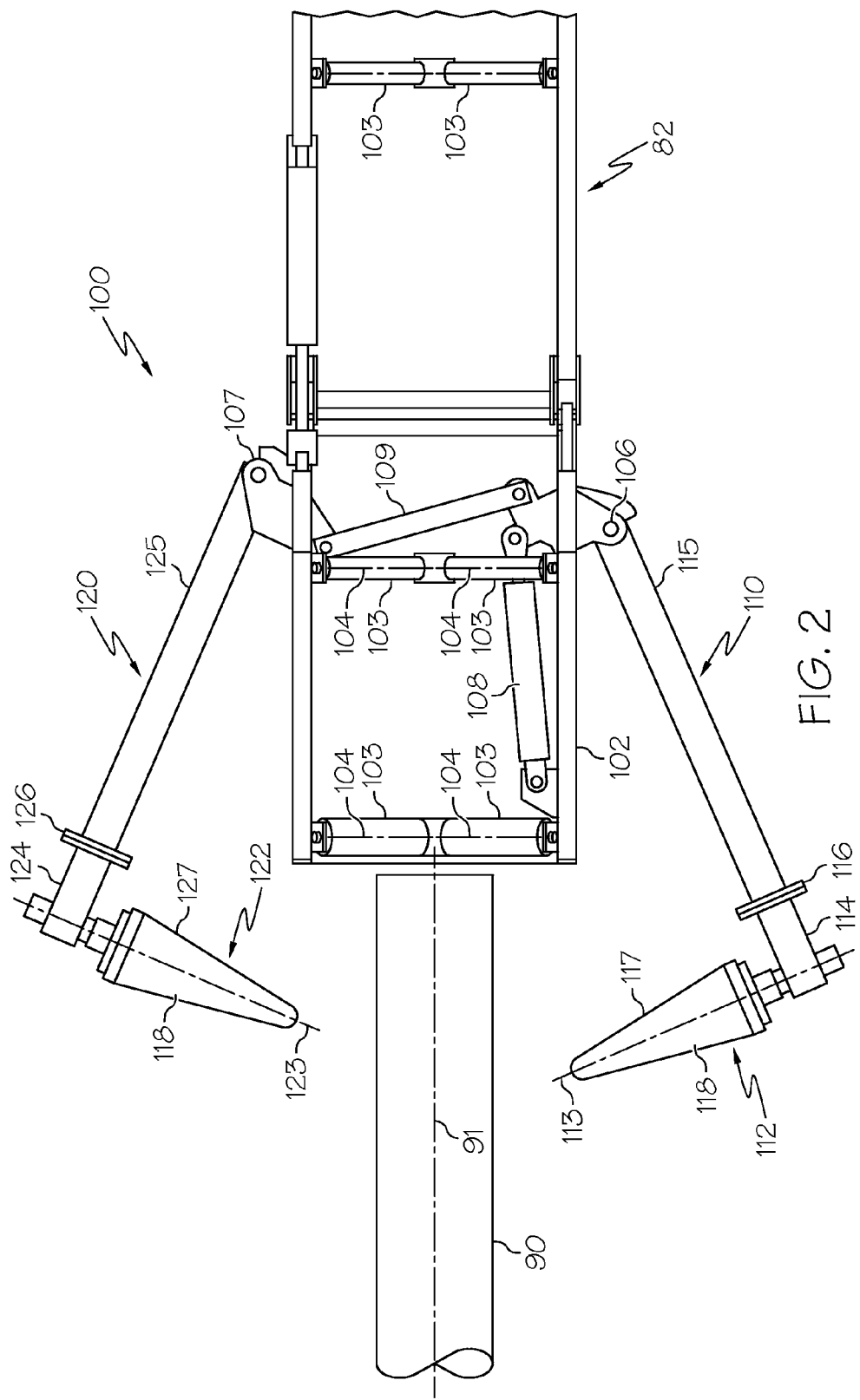
FIG. 2 depicts a top view of a loading device according to one or more embodiments shown and described herein.
Figure 3:
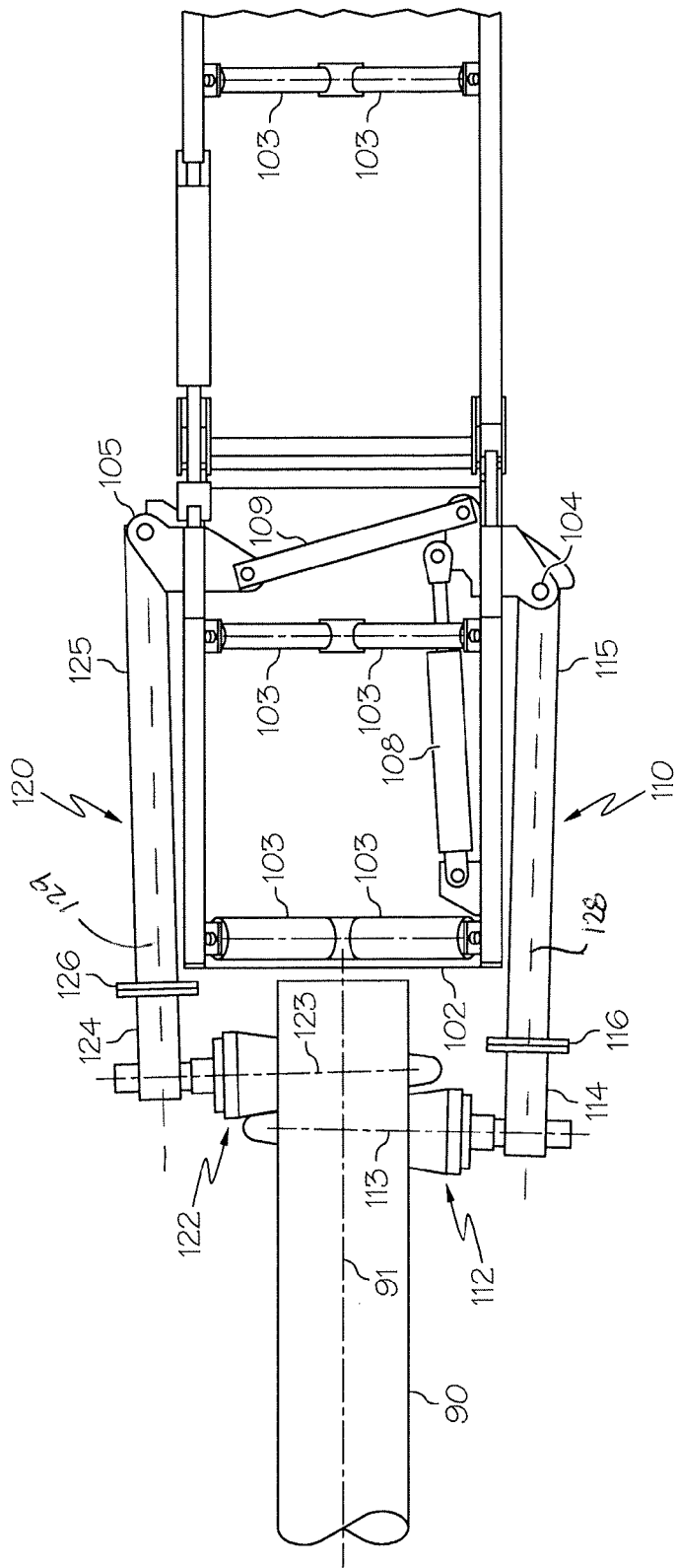
FIG. 3 depicts a top view of a loading device according to one or more embodiments shown and described herein.

Referring now to FIGS. 1-3, one embodiment of a loading device 100 coupled to a pipe fusion machine 80 is depicted. The loading device 100 includes a frame 102 that is coupled to a front boom 82 of the pipe fusion machine 80. The pipe fusion machine 80 positions the loading device 100 such that a first end effector 112 is located proximate to a ground surface 70 and one end of an elongated object 90, here a pipe. The pipe fusion machine 80 may be a MobileFusion machine available from Fast Fusion, LLC of Palisade, Colo.

Referring now to FIGS. 2 and 3, the loading device 100 includes a first effector arm 110 that pivots relative to the frame 102 about a first fulcrum surface 106. The first effector arm 110 includes a first end effector 112 that is coupled to a distal end 114 of, and extending laterally from, the central longitudinal axis 128 of the first effector arm 110 such that the axis of the first effector arm does not intersect with the lifting surface of the effector, but the first end effector axis is perpendicular to and intersects with the central longitudinal axis of the first effector arm. The first end effector 112 may have one of a variety of shapes, including a conical drum 118, as depicted in FIG. 2. The first end effector 112 defines a first end effector axis 113 and a lifting surface 117, which rotates about the first end effector axis. In the embodiment depicted in FIG. 2, the first end effector axis 113 passes through the center of the conical drum 118, while the lifting surface 117 includes the outer surface of the conical drum 118.

The loading device 100 also includes a second effector arm 120 that pivots relative to the frame 102 about a second fulcrum surface 107. The second effector arm 120 includes a second end effector 122 that is coupled to a distal end 124 of, and extending laterally from, the central longitudinal axis 129 of the second effector arm 120 such that the axis of the second effector arm does not intersect with the lifting surface of the effector, but the second end effector axis is perpendicular to and intersects with the central longitudinal axis of the second effector arm. The second end effector 122 may have a variety of shapes including a conical drum 118, as depicted in FIG. 2. The second end effector 122 defines a second end effector axis 123 and a lifting surface 127, which rotates about the second end effector axis. In the embodiment depicted in FIG. 2, the second end effector axis 123 passes through the center of the conical drum 118, while the lifting surface 127 includes the outer surface of the conical drum 118.

The loading device 100 also includes a plurality of roller elements 103 coupled to the frame 102. Each of the roller elements 103 are configured to rotate about a roller element axis 104. The roller elements 103 allow the elongated object 90 to roll along the loading device 100 and the front boom 82 of the pipe fusion machine 80.

The loading device 100 also includes an actuator 108 coupled to the frame 102 and coupled to both the first effector arm 110 and the second effector arm 120 through a linkage 109. The actuator 108 may be a hydraulic or pneumatic cylinder or a linear stepper motor. The first effector arm 110 and the second effector arm 120 pivot in opposing directions about the respective fulcrum surfaces 106, 107 between a retracted position, as illustrated in FIG. 2, and a deployed position, as illustrated in FIG. 3. The linkage 109 couples the first effector arm 110 and the second effector arm 120 to the actuator 108, such that a single actuator 108 may articulate the first effector arm 110 in a first direction, and the second effector arm 120 in an opposing direction. Other embodiments of the loading device 100 may include more than one actuator 108 to articulate the first effector arm 110 and the second effector arm 120.

To lift and position an elongated object 90 for introduction to the pipe fusion machine 80, the actuator 108 may move the first effector arm 110 and the second effector arm 120 into the retracted position, as illustrated in FIG. 2. The pipe fusion machine 80 may position the loading device 100 such that an elongate axis 91 of the elongated object 90 is approximately transverse to the roller element axes 104 of the roller elements 103 of the loading device 100. With the loading device 100 aligned relative to the elongated object 90, the actuator 108 may move the first effector arm 110 and the second effector arm 120 towards the deployed position, as illustrated in FIG. 3. The loading device 100 is positioned such that the first end effector 112 and the second end effector 122 contact the elongated object 90 at a vertical position below the elongate axis 91. Because the elongated object 90 illustrated in FIG. 2 is round, by contacting the elongated object 90 below the elongate axis 91, the first end effector 112 and the second end effector 122 contact the elongated object 90 below the thickest portion of the elongated object 90.

As the first effector arm 110 and the second effector arm 120 continue to move towards the deployed position, the lifting surface 117 of the first end effector 112 and the lifting surface 127 of the second end effector 122 contact the elongated object 90 and lift the elongated object 90 at least partially off of the ground surface 70. With the first effector arm 110 and the second effector arm 120 located in the deployed position, the first end effector axis 113 and the second end effector axis 123 may be approximately perpendicular to the elongate axis 91 of the elongated object 90. Further, as depicted in FIG. 3, the first end effector 112 and the second end effector 122 may be positioned at different distances along the respective first effector arm 110 and second effector arm 120, such that the first end effector 112 and the second end effector 122 are positioned to allow the first effector arm 110 and the second effector arm 120 to move to a fully retracted position.

Referring again to FIG. 1, with the elongated object 90 at least partially lifted off of the ground surface 70, the pipe fusion machine 80 may translate towards the elongated object 90, pushing the elongated object 90 first along the first end effector 112 and the second end effector 122, and subsequently along the plurality of roller elements 103 in a direction towards the pipe fusion machine 80. The elongated object 90 may continue to roll towards the pipe fusion machine 80 for completion of a fusion weld process with another elongated object 90.

Loading devices 100 according to the present disclosure are able to lift elongated objects 90 having a variety of diameters. The first end effector 112 and the second end effector 122 may be inserted beneath elongated objects 90 of various diameters to lift the elongated objects 90. With the first effector arm 110 and the second effector arm 120 located in the deployed position, as depicted in FIG. 3, the elongated object 90 will be approximately centered along the frame 82. The contact points between the elongated object 90 and the first end effector 112 and the second end effector 122 will change based on the diameter of the elongated object 90. Further, the loading device 100 may be used to lift elongated objects 90 made from a variety of materials including, but not limited to, polyethylene, aluminum, steel, plastic, copper, and concrete.

Figure 4:
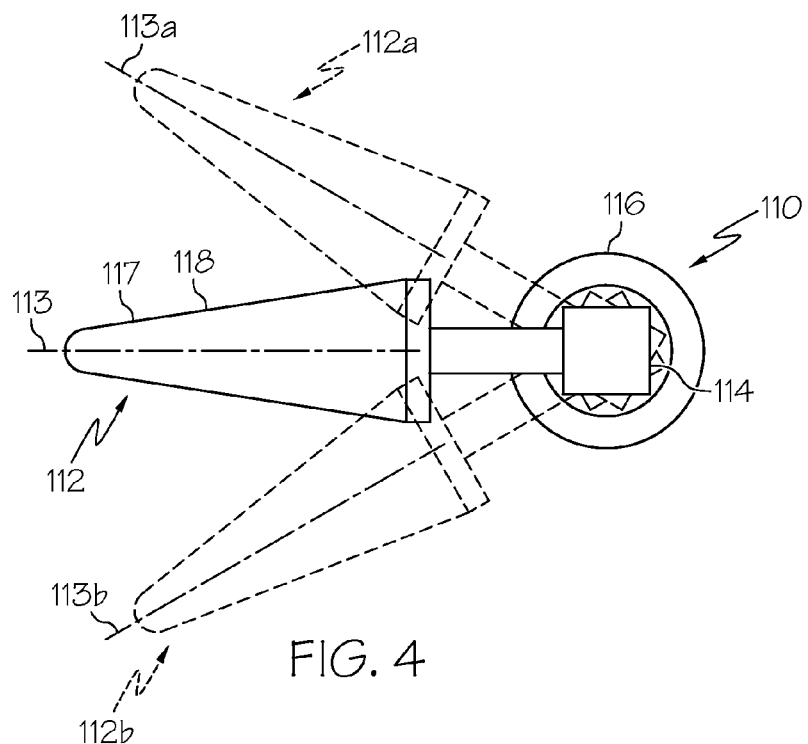
FIG. 4 depicts a front view of an end effector according to one or more embodiments shown and described herein.

Referring again to FIG. 2, in some embodiments of loading device 100, the first effector arm 110 may include a first arm adjuster plate assembly 116 that couples a distal end 114 of the first effector arm 110 to a proximal end 115 of the first effector arm 110. Similarly, the second effector arm 120 may include a second arm adjuster plate assembly 126 that couples a distal end 124 of the second effector arm 120 to a proximal end 125 of the second effector arm 120. As illustrated in FIG. 4, the first arm adjuster plate assembly 116, and similarly the second arm adjuster plate assembly 126, allows the first end effector 112 to be securely positioned between an upward orientation (as illustrated by first end effector 112a and corresponding first end effector axis 113a) and a downward orientation (as illustrated by the first end effector 112b and corresponding first end effector axis 113b). The first end effector 112 and the second end effector 122 may be adjusted to accommodate the pitch of the frame 102 relative to the ground surface 70. The first end effector 112 may be adjusted such that a portion of the first end effector 112 is approximately parallel with the ground surface 70. Such a position may discourage the first end effector 112 from digging into the ground surface 70 as the first effector arm 110 moves from a retracted position to a deployed position, while encouraging contact between the lifting surface 117 and the elongated object 90.

Referring again to FIG. 1, in some embodiments of the loading device 100, the first end effector 112 and the second end effector 122 may include powered rotational mechanisms. First end effectors 112 and second end effectors 122 that include powered rotational mechanisms apply forces to the elongated objects 90 in a direction that corresponds to moving the elongated objects 90 away from the ground surface 70 and towards the pipe fusion machine 80. In these embodiments, first end effector 112 and the second end effector 122 translate the elongated objects 90 towards the pipe fusion machine 80 without translating the pipe fusion machine 80 towards the elongated object 90.

Figure 5:
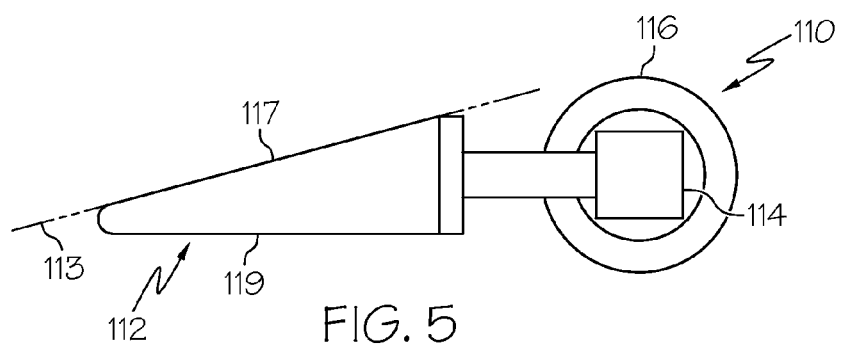
FIG. 5 depicts a front view of an end effector according to one or more embodiments shown and described herein.
Figure 6:
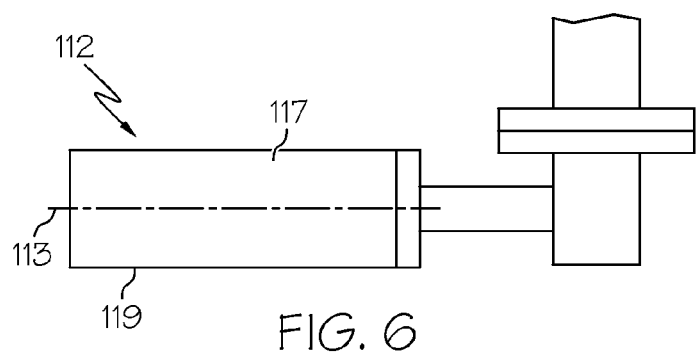
FIG. 6 depicts a top view of an end effector according to one or more embodiments shown and described herein.

Another embodiment of the first end effector 112 is depicted in FIGS. 5 and 6. In this embodiment, the first end effector 112 includes a longitudinally tapered body 119 that includes a lifting surface 117 that contacts an elongated object 90. The first end effector 112 having a tapered body 119 defines a first end effector axis 113 along the lifting surface 117 at approximately the center of the non-tapered portion of the first end effector 112, as illustrated in FIG. 6. First end effectors 112 and second end effectors 122 having a variety of shapes are contemplated.

Figure 7:
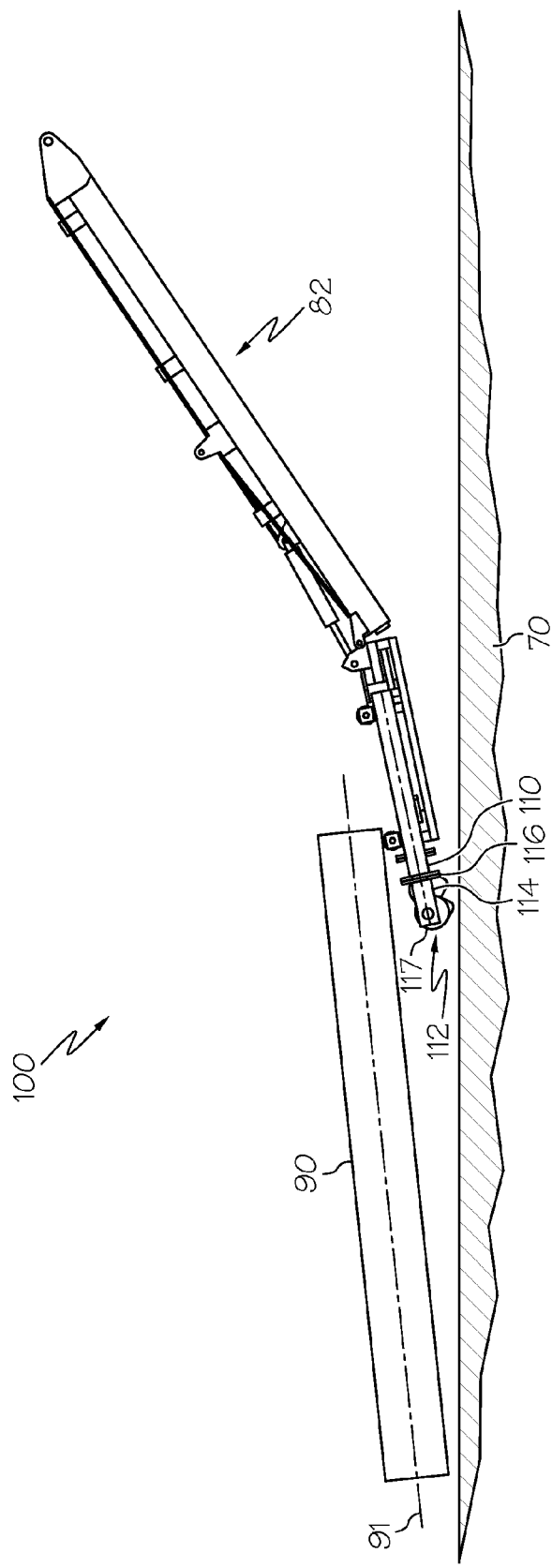
FIG. 7 depicts a side view of a loading device according to one or more embodiments shown and described herein.

Referring now to FIG. 7, some embodiments of the loading device 100 may be adapted to articulate relative to the front boom 82 to which the loading device 100 is coupled. A loading device 100 that articulates relative to the front boom 82 may improve the flexibility of operating the pipe fusion machine (not shown) by increasing the ability of the loading device 100 to at least partially lift the elongated object 90. Such embodiments may include additional actuators that apply force to the loading device 100 to articulate relative to the front boom 82.

Referring now to FIG. 8, embodiments of the loading device 100 may include a first upright arm 210 coupled to a first receiver 202 located at the distal end 114 of the first effector arm 110. The loading device 100 may also include a second upright arm 220 coupled to a second receiver 204 located at the distal end 124 of the second effector arm 120. The first upright arm 210 and the second upright arm 220 may be stanchions that guide the elongated object 90 as the elongated object 90 slides along the roller elements 103 towards the pipe fusion machine (not shown). The first upright arm 210 may include a powered intake wheel 212 that rotates about the first upright arm 210. Similarly, the second upright arm 220 may include a powered intake wheel 212 that rotates about the second upright arm 220. The powered intake wheels 212 may grip the elongated object 90 to apply a force to the elongated object 90 in a direction that pulls the elongated object 90 along the roller elements 103 towards the pipe fusion machine (not shown).

It should now be understood that loading devices according to the present disclosure lift elongated objects from a ground surface and pass those elongated objects towards a pipe fusion machine for a pipe fusion operation. The loading devices include loading arms that pivot between a retracted position and a deployed position. As the loading arms are pivoted to the deployed position, the end effectors contact the elongated object below the thickest portion of the elongated object. As the loading arms continue to pivot to the deployed position, the end effectors at least partially lift the elongated object off of the ground surface, allowing the elongated object to be translated towards the pipe fusion machine.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A loading device for lifting an elongated object having an elongate axis, the loading device comprising:
   a frame having a first fulcrum surface and a second fulcrum surface;
   a first effector arm having a central longitudinal axis, the first effector arm being pivotally coupled with the first fulcrum surface,
   a first end effector having a lifting surface and a first end effector axis about which the first end effector rotates, the first end effector being coupled to the first effector arm such that the first end effector axis is perpendicular to and intersects with the central longitudinal axis of the first effector arm, and wherein the first end effector extends laterally relative to the central longitudinal axis of the first effector arm such that the central longitudinal axis of the first effector arm does not intersect with the lifting surface of the first end effector;
   a second effector arm having a central longitudinal axis, the second effector arm being pivotally coupled with the second fulcrum surface,
   a second end effector having a lifting surface and a second end effector axis about which the second end effector rotates, the second end effector being coupled to the second effector arm such that the second end effector axis is perpendicular to and intersects with the central longitudinal axis of the second effector arm, and wherein the second end effector extends laterally relative to the central longitudinal axis of the second effector arm such that the central longitudinal axis of the second effector arm does not intersect with the lifting surface of the second end effector; and an actuator moving the first effector arm and the second effector arm between a retracted position and a deployed position, wherein the first and second effector arms move in opposing directions as the first and second effector arms are moved by the actuator to the deployed position.

2. The loading device of claim 1, wherein:
the first end effector has a first conical drum; and
the second end effector has a second conical drum.

3. The loading device of claim 2, wherein when the loading device lifts the elongated object, the first effector arm and the second effector arm are located in the deployed position and the first end effector axis and the second end effector axis are transverse to the elongate axis of the elongated object.

4. The loading device of claim 1 wherein the first end effector comprises a first body tapered longitudinally along the first end effector axis.

5. The loading device of claim 1, wherein when the loading device lifts the elongated object, the first end effector and the second end effector contact the elongated object below the elongate axis.

6. The loading device of claim 1 further comprising a plurality of roller elements, each roller element having a roller element axis, wherein when the loading device lifts the elongated object, each of the roller element axes are transverse to the elongate axis of the elongated object.

7. The loading device of claim 1, wherein the first effector arm comprises a first arm adjuster plate assembly allowing the first end effector to pivot about the central axis of the first effector arm.

8. The loading device of claim 1 further comprising a first upright arm coupled to a first receiver located at a distal end of the first effector arm.

9. The loading device of claim 8, wherein the first upright arm comprises a powered intake wheel.

10. A loading device comprising:
a frame having a first fulcrum surface and a second fulcrum surface;
a first effector arm having a central longitudinal axis, the first effector arm being pivotally coupled with the first fulcrum surface such that a first end effector axis is perpendicular to and intersects with the central longitudinal axis of the first effector arm, a first end effector having a lifting surface and the first end effector axis about which the first end effector rotates, wherein the first end effector extends laterally relative to the central longitudinal axis of the first effector arm such that the central longitudinal axis of the first effector arm does not intersect with the lifting surface of the first end effector, a second effector arm having a central longitudinal axis, the second effector arm being pivotally coupled with the second fulcrum surface such that a second end effector axis is perpendicular to and intersects with the central longitudinal axis of the second effector arm, a second end effector having a lifting surface and the second end effector axis about which the second end effector rotates, wherein the second end effector extends laterally relative to the central longitudinal axis of the second effector arm such that the central longitudinal axis of the second effector arm does not intersect with the lifting surface of the second end effector, and an actuator that moves the first effector arm and the second effector arm between a retracted position and a deployed position, wherein the first and second effector arms move in opposing directions as the first and second effector arms are moved by the actuator to the retracted position, wherein the first end effector lifting surface and the second end effector lifting surface are each inclined to a ground surface.

11. The loading device of claim 10, wherein:
when the loading device lifts an elongated object with the first effector arm and the second effector arm located in the deployed position, the first end effector axis and the second end effector axis are both transverse to an elongate axis of the elongated object.

12. The loading device of claim 11, wherein the first end effector and the second end effector contact the elongated object below the elongate axis to apply a lifting force.

13. The loading device of claim 10, wherein the first end effector comprises a first conical drum having the lifting surface, and the second end effector comprises a second conical drum having the lifting surface.

14. The loading device of claim 10, wherein the first effector arm comprises a first arm adjuster plate assembly that allows the first end effector to pivot about the central axis of the first effector arm.

* * * * *